United States Patent [19]

Peterson

[11] 4,362,062
[45] Dec. 7, 1982

[54] BELT-TENSION GAUGE

[75] Inventor: Avo Peterson, Meerbusch-Niers, Fed. Rep. of Germany

[73] Assignee: V. Löwener Maschinen GmbH, Langenfeld, Fed. Rep. of Germany

[21] Appl. No.: 223,373

[22] Filed: Jan. 8, 1981

[30] Foreign Application Priority Data

Jan. 9, 1980 [DE] Fed. Rep. of Germany ....... 3000549

[51] Int. Cl.³ .............................................. G01L 5/06
[52] U.S. Cl. ................................................ 73/862.47
[58] Field of Search ............ 73/862.45, 862.47, 862.48

[56] References Cited

U.S. PATENT DOCUMENTS

| | | | |
|---|---|---|---|
| 2,182,267 | 12/1939 | Scusa | 73/862.47 |
| 2,471,999 | 5/1949 | Boos | 73/862.47 |
| 3,177,708 | 4/1965 | Saxl | 73/862.47 |
| 3,494,183 | 2/1970 | Sokolosky | 73/862.45 |

FOREIGN PATENT DOCUMENTS 230473 10/1968 U.S.S.R. ........................... 73/862.45

Primary Examiner—Charles A. Ruehl
Attorney, Agent, or Firm—Montague & Ross

[57] ABSTRACT

A belt-tension gauge for measuring the tension of a belt spanning a pair of wheels, especially a V-belt in the engine compartment of a motor vehicle, comprises two pivotally interconnected housing parts which are biased by a spring spread apart and carry respective rollers which bear upon one side of the belt while a member at the pivot rests against the opposite side. The relative displacement of the two housing parts by the spring is displayed by indicia on one of the housing parts and indicates belt tension.

11 Claims, 8 Drawing Figures

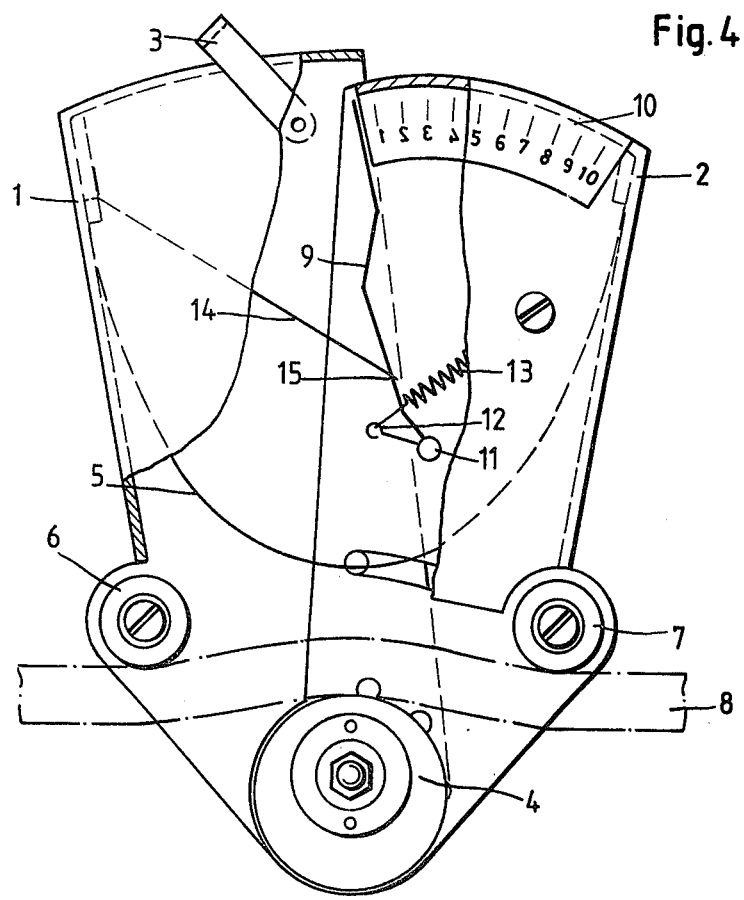
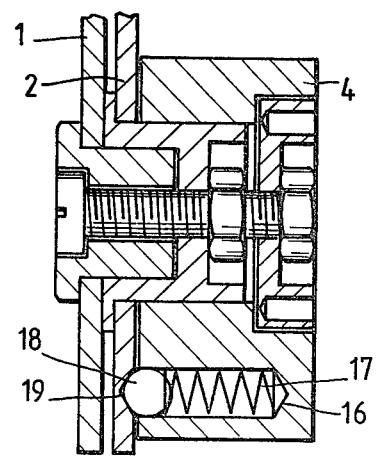
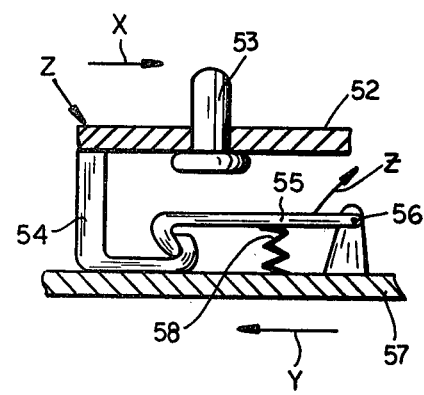

BELT-TENSION GAUGE

FIELD OF THE INVENTION

The present invention relates to a belt-tension gauge and, more particularly, to an easily manipulated device capable of measuring the tension of a belt spanning a pair of wheels and especially in the engine compartment of a motor vehicle.

BACKGROUND OF THE INVENTION

It is often desirable to ascertain with some degree of precision the tension in a belt running over two or more wheels and especially the tension in a V-belt spanning a pair of V-belt pulleys in the engine compartment of an automotive vehicle. Such belts are used to drive the generator or alternator of the vehicle, power steering pump, or air-conditioning compressor and a variety of other accessories. Insufficient belt tension may result in inefficient drive of the accessories while excessive belt tension may result in early wear and breakage, damage to shaft pulleys of the driven member and undue stress on the system.

Although belt tension is frequently ascertained by guesswork, there is a well recognized need for more accurate measuring both for the initial tension setting and during diagnostic studies of engine operation or upon belt replacement.

It has already been proposed to provide a device capable of measuring belt tension which comprises a pair of support members carried by a housing and which are placed against one side (generally the upper side) of a belt, while a third pressure or tension member is brought to bear on the opposite side of the belt usually the underside by the force of a spring in the housing which is braced against the latter.

The linerally effective spring thus urges the pressure member against the belt in a manner which tends to flex the latter between the support members, the degree of such flexure being an indication of the tension on the belt which is displayed by an indicating member utilizing a scale and pointer system, for example.

Conventional systems of this type are rather large so that the locations at which the device can be used are limited and universal application in the vehicle field is excluded.

Furthermore, these devices are relatively heavy and have centers of gravity located such that the device may be difficult to hold during measuring operations and to grip for manual removal from the belt and during setting which is commonly required between successive measurements.

Both the size and the weight disadvantages are associated largely with a need for massive housing to be able to support the high spring force which is required at the pressure member.

In devices of this kind, moreover, the measurement is effected by a compensating method which generally involves manual alteration of the spring force until two reference marks are aligned so that a rapid read-out of belt tension is usually not possible nor is a continual read-out given.

It has also been found that such devices have a fixed transmission ratio between the pressure member and the pointer such that the range of measurement between an excessively loose belt tension and excessively high belt tension is limited. This, of course, makes the device relatively imprecise.

In use, earlier belt tension gauges have been found to leave marks on the belt and so deform the belt that kinks may result. This is detrimental to the belt structure and reduces the life of the belt as well as its uniform or smooth operation. The belt marking appears to be a result of the fact that the support members do not allow compensation for variation in the belt length between the support members during a measurement.

In addition, since the spring characteristic varies as a function of the displacement of the pressure member, the earlier belt-tension gauges have been found to be sensitive to belt thickness. Obviously this sensitivity increases as variations in thickness become proportionally high by comparison to the total spring length. As a result smaller units are less accurate than larger units in the conventional devices.

Almost invariably conventional units are asymmetrical in construction so that they cannot be manipulated as readily by both left-handed and right-handed users. Depending upon the scale and pointer construction and orientation, conventional systems of the type described may be inconvenient to read, generally displaying the result in only one or two viewing planes.

Finally, for the reasons already described, manipulation of the devices is fatiguing so that in practice they have found application only during vehicle manufacture, i.e. in the assembly plant or factory, and have not received widespread acceptance in the service industry.

OBJECTS OF THE INVENTION

It is the principal object of the present invention to provide an improved belt-tension gauge which overcomes all of the described disadvantages.

Another object of the invention is to provide a belt-tension gauge which is free from the drawbacks of the earlier systems described and others, and which is of lightweight, comparatively small size and which is easily manipulated and more precise than earlier systems.

Yet another object of this invention is to provide a compact, easily read belt-tension gauge whose accuracy is substantially independent of belt thickness and which tends to mark the belt to a lesser extent than earlier devices.

SUMMARY OF THE INVENTION

These objects and others which will become apparent hereinafter are attained, in accordance with the present invention, in a belt-tension gauge which comprises a pair of housing parts which are pivotally connected together and are provided at their pivot with a pressure member adapted to bear upon one side of the belt, each of the housing parts carrying a respective support member preferably in the form of a roller, adapted to engage the opposite side of the belt. The housing parts are biased away from one another by a spring tending to rotate the support rollers in opposite senses relative to the pivot axis at the pressure member.

According to a feature of the invention, the housing parts are generally flat and one fits substantially completed into the other while the pressure member is an eccentric rotatable about the pivot axis and having a surface disposed eccentrically with respect to this axis and rotatable into position against the belt.

According to this invention, moreover, the flat housing part can carry a scale, e.g. on a V-section surface say at the end of this housing part remote from the pivot so that the scale is readily readable. The scale-carrying housing part can be rotated, in inoperative position of the device, substantially completely into the other housing part to provide an especially compact construction.

Locking or latch means can be provided for retaining the two housing parts in their maximum nested position and it has been found to be advantageous to provide the locking means so that it can be readily released to effect a measurement.

The gauge described thus operates on a new measuring principle in belt-tension evaluation because of the variable spacing of the backing or support rolls which allows automatic compensation for V-belt thickness variation and tolerances. The system provides an exceptionally convenient slim line construction whereby the scale can be read from either broad side of the flat housing and from the end thereof remote from the rolls, thereby allowing the unit to be used even where space is limited and the scale to be read with ease.

Once the device is mounted on the belt to take an initial reading, it can be left in place for further readings during the belt tensioning operation without difficulty so that the user can readily ascertain whether the adjustment is having the desired effect. Furthermore, the device is completely mechanical in nature as is convenient for use remote from a service facility.

According to yet another feature of the invention, a detent or indexing means is provided to set the desired angular position of the eccentric member carrying the bearing surface and forming a pressure member of the device.

Thus the invention provides an apparatus having two housing parts, wherein a support member is firmly arranged on each housing part, and both the housing parts are connected with each other through a rotary bearing provided in the tension member and stand under the pressure of a spring which effects a pivoting of the housing parts away from each other, wherein both the housing parts execute a pivotal movement around the tension member.

Through the structuring of the apparatus in accordance with the invention, the spring force does not act directly onto one of the contact members, but indirectly through both the housing parts which in that case form lever arms so that the required spring force is substantially smaller than the force acting through the contact members on to the belt. The spring can therefore be substantially weaker than the springs of the known apparatuses.

Hence the apparatus itself can also be substantially lighter and smaller since the apparatus according to the invention need be dimensioned for the force acting on the belt only in the region of the contact members. Since not only the spacing between the support members and the tension member, but also the spacing between the individual support members varies due to the pivotal movement of both the housing parts and thereby also of both the support members around the tension member, the further advantage results that the compensating movement of the belt is promoted as well as the formation of pressure marks on the belt is reduced and hysteresis phenomena in the kink region of the belt are thereby reduced. The reproducibility of the measurements at the same place as well as also the measurement accuracy altogether are increased.

The spring effective between both the housing parts can be any desired compression spring. A particularly simple embodiment of the invention however consists therein, that the spring effective between the housing parts is constructed as leaf spring which has received its bias through U-shaped bending in the middle region. In this case, the leaf spring is expediently arranged in the apparatus in such a manner that both the ends of the leaf spring are supported in the upper region of the housing parts and the middle region, bent into U-shape, of the leaf spring faces the tension member, since the spring force is then transmitted through a relatively long lever arm to the belt.

BRIEF DESCRIPTION OF THE DRAWING

The above and other objects, features and advantages of the present invention will become more readily apparent from the following description, reference being made to the accompanying drawing in which:

FIG. 4 shows the apparatus according to FIG. 1 in the end setting, likewise in front elevation, wherein the front metal plates of the outer and the inner housing parts have been partially removed;

FIG. 5 shows the lower part of the apparatus according to FIG. 1 in a section along the line II—II in FIG. 1 to greater scale;

FIG. 8 is a diagram illustrating another latch means in section in accordance with the present invention.

SPECIFIC DESCRIPTION

Figure 1:
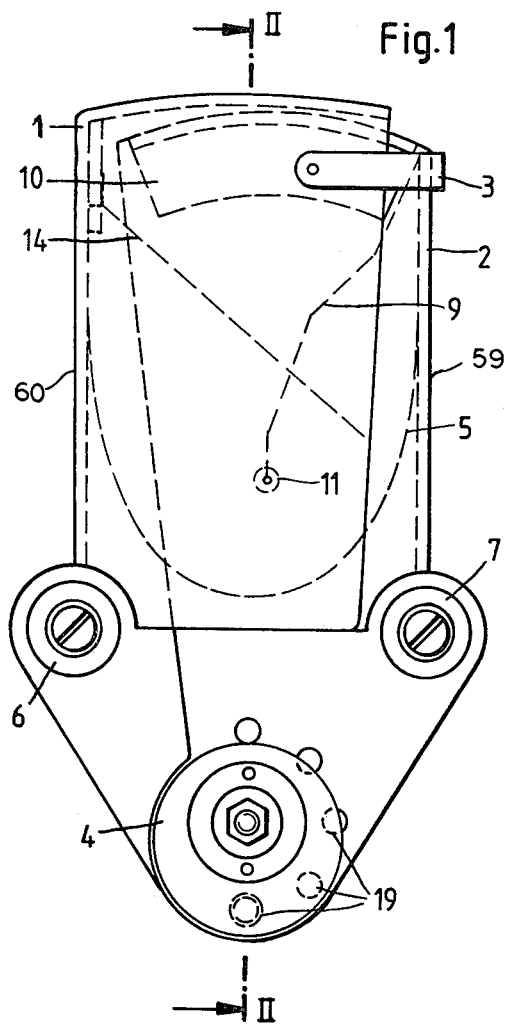
FIG. 1 is a diagrammatic front elevation of an apparatus for the measurement of the tension of a belt in the basic setting according to the invention.

The embodiment illustrated in FIGS. 1 to 5 consists of an outer housing part 1 and an inner housing part 2. Rotatably fastened to the outer housing part 1 is a bracket 3, which can be pivoted over the inner housing part 2 (FIG. 1) and which thereby locates the apparatus in the basic setting. For the performance of the measuring operation, the bracket 3 is pivoted upwardly (FIG. 4). The bracket 3 was omitted in FIGS. 2 and 3.

Both the housing parts 1 and 2 are connected with each other through a rotary bearing provided in the tension member 4 and stand under the pressure of a leaf spring 5 (FIGS. 1 and 4), which effects a pivoting of the housing parts 1 and 2 away from each other, wherein the housing parts 1 and 2 execute a pivotal movement around the tension member 4. A support member 6 is firmly arranged on the outer housing part 1 and a support member 7 at the inner housing part 2, wherein the support members 6 and 7 are provided with rotatable rollers. Due to the pivotal movement of both the housing parts 1 and 2 and thereby also of both the support members 6 and 7 around the tension member 4, the spacing between the support members 6 and 7 on the one hand and the tension member 4 on the other hand varies, which has the consequence of a bending of the belt 8 (FIG. 4). The bending is the greater, the less is the tension of the belt 8.

During the measuring operation, the apparatus is placed on the belt in the basic setting illustrated in FIG.

1, however with the bracket 3 opened, in such a manner that the support members 6 and 7 are disposed above and the tension member 4 below the belt 8. During the placing of the apparatus onto the belt 8, both the housing parts 1 and 2 are held together manually at their upper ends, for which only very little force is necessary, namely because of the relatively long lever arm between the rotary bearing provided in the tension member 4 and the upper ends of the housing parts 1 and 2. Thereafter, one lets both the housing parts 1 and 2 pivot apart until the setting resulting from the spring force and the belt tension or the end setting in the case of too loose a belt 8 (cf. FIG. 4) is attained. Both the housing parts 1 and 2 can be provided laterally with a knurling or with finger detents or the like in the upper region in order to facilitate the manipulation of the apparatus.

Figure 2:
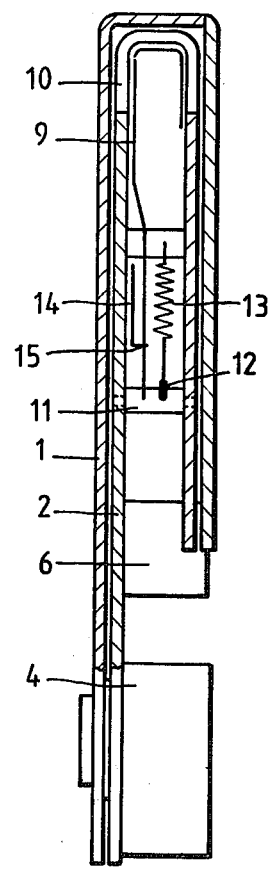
FIG. 2 is a section along the line II—II in FIG. 1 with the lower part in side elevation.
Figure 3:
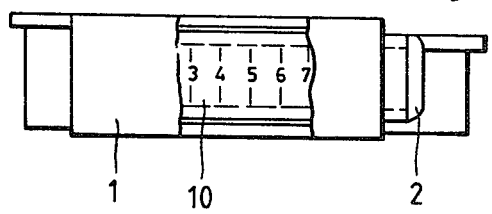
FIG. 3 is a plan view of the apparatus according to FIG. 1 wherein the upper closing metal plate of the outer housing part is partially removed.

The indication of the measured tension of the belt takes place through an indicating device which displays a pointer 9 and a scale 10. The upper end of the pointer 9 and the scale 10 are constructed in U-shape in such manner that the measured value can be read off from both sides of the apparatus, from the front and rear, and from above. The scale 10 consists of a transparent material. The pointer 9 is firmly connected with a spigot 11, which is rotatably borne in the inner housing part 2 (FIG. 2). Connected through a lever 12 with the spigot 11 is the one end of a tension spring 13 (FIG. 4), the other end of which is fastened to the inner housing part 2. The scale 10 is likewise fastened to the inner housing part 2. The pointer 9 is entrained by an entraining member 14 on the pivoting apart of both the housing parts 1 and 2. The entraining member 14 in the illustrated example of embodiment consists of a wire which is fastened by one end to the lateral closure metal plate of the outer housing part 1 and the other, bent-over end 15 of which engages behind the pointer 9.

With appropriate formation of the scale 10, the upper righthand edge of the outer housing part 1 can also instead of the pointer 9 indicate the measured value.

Through the structuring of the pointer 9 in the region, in which the bent-over end 15 of the entraining member 14 slides along the pointer 9 during the pivoting apart of both the housing parts 1 and 2, the scale division can be chosen in accordance with the requirements. Thus, the concerned region of the pointer 9 can receive different setting angles; it can be rectilinear or curved. Through such a structuring of the pointer 9, a variation of the scale division (resolution) is brought about within certain limits. Furthermore, through appropriate constructional determination of that region of the pointer 9, in which the entraining member 14 slides along the pointer 9, and through constructional determination of a certain free path of the entraining member 14 relative to the pointer 9, that the entire scale length stands completely at disposal for the important measurement range disposed between "too loose" and "too tight".

The tension member 4 can be provided with a rotatable roller, for which the outer diameter of the roller is adjusted to the thickness of the belt. The adaptation to different belt thickness is, however, very simple when the tension member 4 is constructed as a rotatable eccentric. The setting of the eccentric is illustrated in the drawing for the measurement of the tension of a belt 8 with the greatest envisaged thickness. The smaller the thickness of the belt 8, the more must the eccentric be rotated; for the measurement of the tension of a belt 8 with the smallest envisaged thickness, the eccentric must be rotated through 180°. The eccentric can be so constructed that it notches in certain settings. This notching-in can be effected by any desired means. In a particularly simple embodiment, a bore 16, in which is disposed a ball 18 standing under the pressure of helical spring 17, is provided in the tension member 4 constructed as an eccentric and the surface of the inner housing part 2 facing the eccentric is provided with depressions 19, which are arranged on a circular arc around the rotational axis of the eccentric, wherein the radius of the circular arc corresponds to the spacing of the bore 16 from the rotational axis of the eccentric. The depressions 19 represent the detent positions for the setting of the eccentric.

In FIG. 8 I have shown a latch arrangement which can be substituted for the latch 3 previously mentioned. For example, the housing part 2 may have a wall 52 in which a push-button 53 is mounted and a hook 54 which can be engaged by a pawl 55 shrinkably mounted at 56 on a wall 57 of the housing part and which can slide into the housing part 2. This pawl is biased in the direction of the arrow Z by a spring 58. Thus, when the two housing parts are brought into the closed position, (FIG. 1) by movement relatively in the direction of the arrows X and Y about their common pivot axis the pawl 55 can ride over and be engaged in the hook 54 by depression of the button 53 thereby locking the two housing parts in the closed or inoperative position shown.

When the actuating surfaces 59 and 60 of the two housing parts are then pressed toward one another, after the unit has been placed over the belt, the spring 58 swings the pawl 55 in the direction of arrow Z and allows release of the two housing parts to permit them to spread apart into the position shown in FIG. 4.

Figure 6:
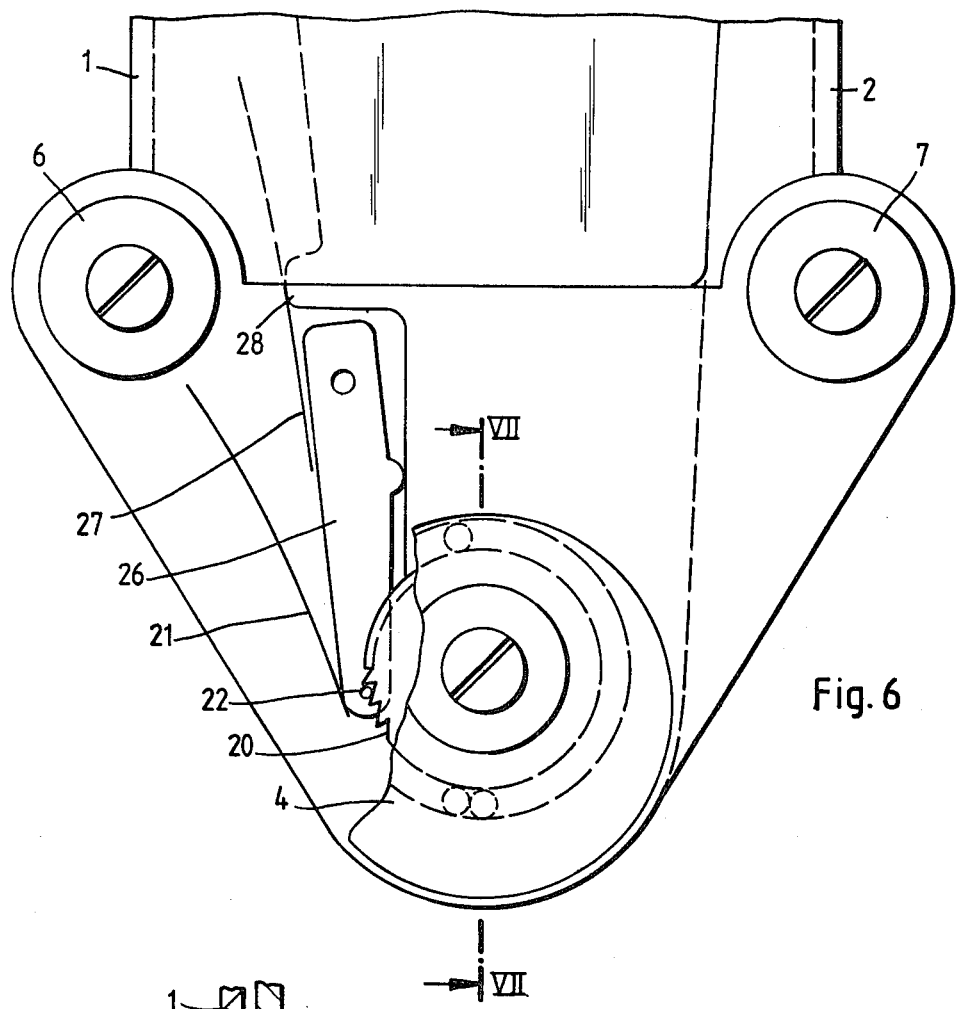
FIG. 6 shows the lower part of another apparatus in the basic setting, in a front elevation to a scale corresponding to FIG. 5.
Figure 7:
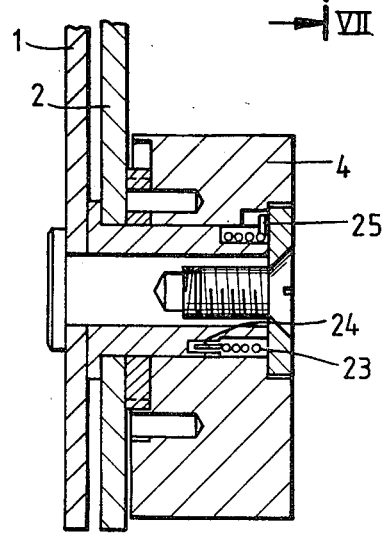
FIG. 7 is a section along the line VII—VII in FIG. 6.

In another embodiment (FIGS. 6 and 7), the eccentric is connected with a ratchet wheel 20, into which engages the detent 22 standing under the pressure of a leaf spring 21. Before the performance of a measurement, the tension member 4 constructed as eccentric is rotated into the position illustrated in FIG. 6. In that case, a helical spring 23, which is arranged coaxially with the rotational axis of the eccentric and which by its one end 24 engages into a bore provided in the bearing spigot and the other end 25 of which engages into a slot provided in the eccentric, is stressed. After the placing of the apparatus on to the belt 8, both the housing part 1 and 2 are compressed somewhat so that the inner housing part 2 pushed the lever 26, at which the detent 22 is disposed, back so far that the detent 22 releases the ratchet wheel 20. This has the consequence that the eccentric due to the stress in the helical spring 23 rotates until all three contact members 4, 6 and 7 lie against the belt 8. Thereafter, one lets both the housing parts 1 and 2 pivot apart. The detent 22 then again engages into the ratchet wheel 20 and prevents a further rotation of the eccentric. Arranged in the outer housing part 1 is a further spring 27, which in the basic setting of the apparatus lies against a lug 28 provided at the inner housing part 2 and can therefore not act on the lever 26. After the pivoting apart of the housing parts 1 and 2, the spring 27, which is appreciably stronger than the spring 21, lays itself against the spring 28 so that a further rotation of the eccentric is completely excluded.

Apart from the spring-travel-dependent pointer drive illustrated in the drawing, the apparatus according to the invention can also be equipped with a deflection-dependent pointer drive. Required for this is merely a sensor finger which stands in connection with at least one of the support members and which lies against the upper side of the belt. A combination is however also possible, thus a pointer drive which is dependent on spring travel as well as also on deflection. In this embodiment, the setting by means of an eccentric becomes redundant because the belt thickness comes into the measurement result through the sensor finger.

I claim:

1. A belt-tension gauge comprising:
    a housing formed by a pair of housing parts pivotally connected for relative swinging movement about a pivot axis;
    means forming a rotary bearing between said housing parts at said pivot axis;
    a pressure member mounted on the means forming said bearing and adapted to engage one side of a belt whose tension is to be measured;
    a respective backing member on each of said housing parts adapted to engage an opposite side of said belt;
    spring means in said housing for urging said housing parts in opposite senses about said axis whereby said backing members are displayed away from each other; and
    a scale on said housing for indicating the degree of relative displacement of said parts by said spring thereby displaying the tension in said belt.

2. The gauge defined in claim 1 wherein one of said housing parts is formed of a box shape open to the other of said housing parts and can receive said other housing part substantially completely in a closed position of the gauge, said other housing part being formed with said scale.

3. The gauge defined in claim 1 wherein said spring means includes a leaf spring having a U-shaped bent portion imparting spring force thereto.

4. The gauge defined in claim 3 wherein said leaf spring is mounted in said housing with opposite ends separated against said housing parts and sides therein turned away from said axis and said U-shaped bent portion is disposed centrally of said leaf spring proximal to said axis.

5. The gauge defined in claim 1 wherein said backing members are rollers rotatable on the respective housing parts.

6. The gauge defined in claim 1 wherein said pressure member is an eccentric rotatable on said housing.

7. The gauge defined in claim 6, further comprising a spring-loaded ball indexing means for angularly indexing said eccentric in a plurality of selective positions.

8. The gauge defined in claim 6, further comprising pawl and ratchet means for indexing said eccentric in a selected angular position thereof.

9. The gauge defined in claim 8 further comprising a torsion spring between said eccentric and said housing tending to rotate said eccentric into a starting position.

10. The gauge defined in claim 1 wherein said scale is of U-section enabling the reading thereof from opposite sides of said housing and from an end thereof.

11. The gauge defined in claim 1, further comprising latch means for releasably locking said housing part in a compact position of said gauge with said housing parts nested together.

* * * * *